Sept. 4, 1951  C. Y. JONES  2,566,768
T BELT
Filed July 22, 1947  2 Sheets-Sheet 1

C. Y. Jones
INVENTOR
BY Snow+Co.
ATTORNEYS.

Sept. 4, 1951 C. Y. JONES 2,566,768
T BELT
Filed July 22, 1947 2 Sheets-Sheet 2

C. Y. Jones
INVENTOR
BY C.A.Snow&Co.
ATTORNEYS.

Patented Sept. 4, 1951

2,566,768

UNITED STATES PATENT OFFICE 2,566,768

T BELT

Charles Y. Jones, Carlisle, Pa.

Application July 22, 1947, Serial No. 762,699

3 Claims. (Cl. 74—231)

This invention relates to a drive belt, and more particularly, refers to a traction or pulley belt of novel construction, adapted particularly for use in conjunction with specially formed global wheels, such as those which are the subject of my Patent No. 2,448,222, issued August 31, 1948.

Various types of pulley and traction belts have been known in the art, but certain disadvantages are known to exist in connection with such belts, as for instance, it is common that ordinary pulley belts are prone to slippage, and do not permit fully efficient traction. In addition, chaffing of the belt relative to the wheels or pulleys on which it is mounted also quite commonly occurs. It is an important object of the invention, accordingly, to provide a belt in which these disadvantages will be eliminated, whereby full traction is permitted, without slippage.

Another important object of the invention is to provide a belt of the type stated which readily lends itself to use as a conveyor belt, without in any way affecting the construction of the belt whereby full traction and prevention of slippage is permitted.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1:
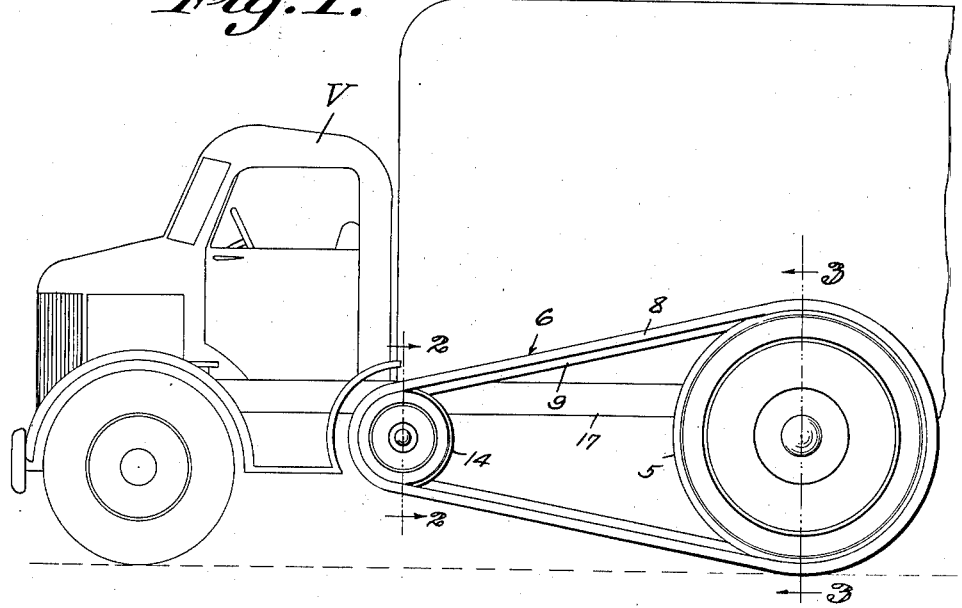
Figure 1 shows the belt as applied to one type of traction used, the belt being shown in side elevation mounted in association with a drive wheel and traction wheel of a vehicle.

Referring to the drawings in detail, 5 designates a global traction wheel, the construction of which will not be described herein, since it constitutes the subject matter of the issued patent, specified hereinbefore. It is sufficient to state, for the purposes of this application, that a global wheel of this type embodies hemispherical portions, spaced apart, and preferably rubber tired. In the embodiment of the invention illustrated in Figure 1, a wheel 5 is disposed on each side of a vehicle V, of any suitable type, and constitutes a traction wheel whereby the vehicle may be powered over its supporting surface.

At 6 is generally indicated an endless belt, of relatively broad formation, the outer surface of which is slightly concave, as shown at 7. The side walls 8 of the belt are, preferably, also concave, and on the inner surface of the belt is a centrally positioned longitudinal flange or ridge 9.

Figures 2, 3:
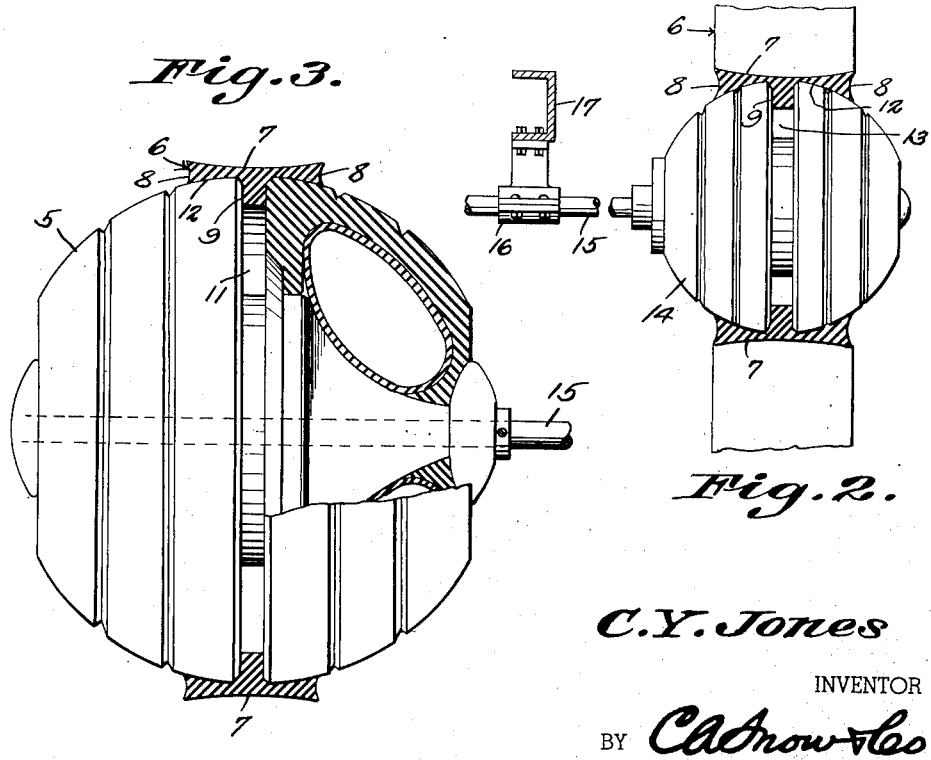
Figure 2 is a view taken substantially on line 2—2 of Figure 1, in which a drive wheel around which the belt passes remains in elevation.
Figure 3 is a view taken substantially on line 3—3 of Figure 1, a portion of a traction wheel on which the belt is mounted remaining in elevation.

The space between the hemispherical portions of the global traction wheel 5 is indicated at 11, and by particular reference to Figure 3, it is seen that the longitudinal flange 9 on the inner surface of the belt 6 fits into the space, fully preventing lateral deflection of the belt during its movement. From either side of the flange 9, to the outer edges of the belt 6, the belt is curvingly formed, conformably to the portions of the global wheel which it overlies.

At 13 is indicated the space between the hemispherical portions of a smaller global wheel 14, constituting a drive wheel. This is carried by shaft 15, which may be suitably journaled in bearing 16, carried by the frame 17 of the vehicle.

During operation of the vehicle V, the concave outer surface 7 constitutes the traction surface whereby the vehicle is driven over a supporting surface. Normally, the outer surface 7 is of concave formation, but when it engages the supporting surface, it will, as may readily be observed, be flattened, this action being aided by the concave side walls 8 of the belt. An increased traction area, compared to the normal width of the outer surface 7, is accordingly provided, so as to provide greater efficiency in the performance by the belt of its traction function.

Additionally, it is to be noted that the total surface area of the inner side surfaces 12, and longitudinal flange 9, provide for a vastly increased adhesion area, with less friction, the belt being so formed as to immediately grip, without slippage, the surfaces of the wheels engaged thereby.

Figure 4:
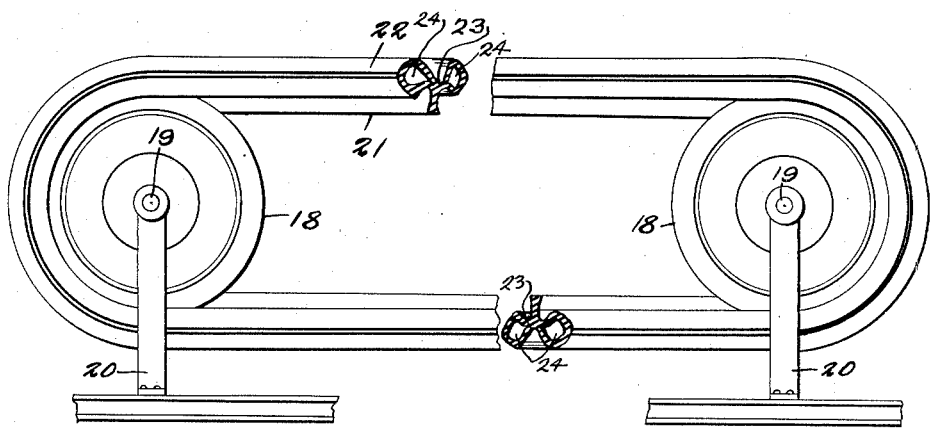
Figure 4 is a side elevational view of a slightly modified construction, portions being broken away, illustrating the belt mounted in association with a stationary machine drive means, and used as a trough-type conveyor.
Figure 5:
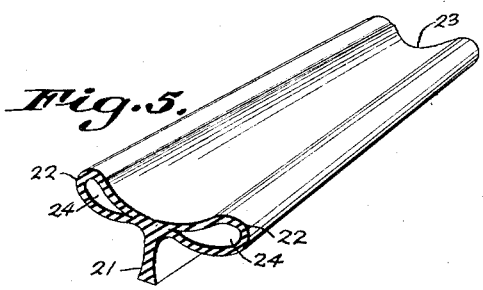
Figure 5 is a perspective view showing a portion of the modified construction illustrated in Figure 4.

Referring to Figure 4, at 18 are shown global wheels, mounted on shafts 19 journaled in supports 20, either shaft 19 being powered by a suitable means (not shown).

In this figure is shown the belt as applied to a stationary machine drive, and used as a trough-type conveyor. The longitudinal inner flange of the belt is shown at 21, while the side walls are shown at 22, these being illustrated as being relatively thickened when compared to the belt previously described, whereby to define a longitudinal trough 23. A belt as shown provides all the advantages of the ordinary band-type traction belt used on a stationary machine drive in the sense that it gives a far greater traction area than a V-belt or the like, and in face improves on a band-type belt to the extent that its multiple contoured inner surface increases the traction area, and prevents lateral deflection of the belt while driving or being driven by the wheels on which it is mounted. At the same time, the belt is readily adapted for use as a conveyor. The sides of the belt may be molded to provide a hollow construction as shown at 24, which permits flexing as the belt passes around the wheels 18.

Figure 6:
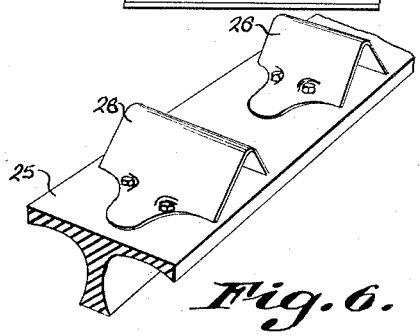
Figure 6 is a perspective view showing a portion of a modified construction of another type of conveyor.

In Figure 6, the belt has a flat upper surface 25, to which are secured in spaced relation cleats 26, defining another type of conveyor.

Figure 7:
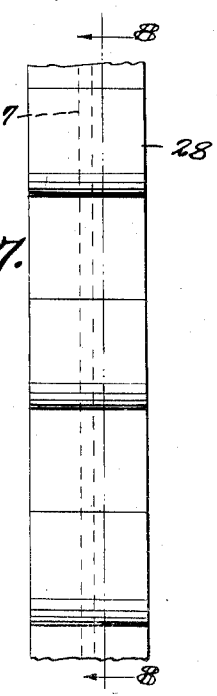
Figure 7 is a front elevational view showing another modified construction, illustrating a bucket-type vertical conveyor.
Figure 8:
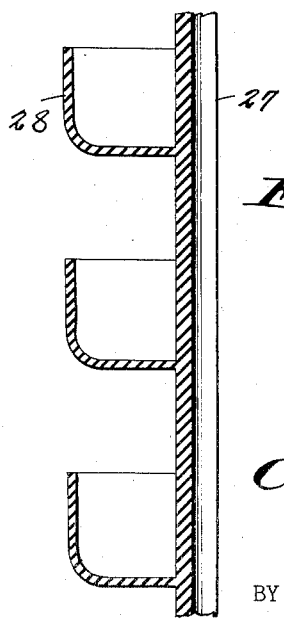
Figure 8 is a view taken on line 8—8 of Figure 1.

A vertical type bucket conveyor is illustrated by way of example in Figures 7 and 8, this embodying the use of a longitudinal inner flange 27 on the inner surface of the belt, while buckets 28 of conventional formation are suitably affixed to or formed on the outer surface.

What is claimed is:

1. A transmission belt including a wide body portion formed to a cross sectional configuration in which the top and bottom faces thereof are each concaved, said body when viewed in cross section being thinnest at its center and increasing in width toward its opposite side edges, the thickened opposite side portions of said body being adapted to be flattened to reduce their thickness on exertion of pressure thereagainst; and a single narrow longitudinal flange integral with and extending longitudinally of the bottom surface of said body, said flange depending from the thin center portion of said body.

2. A transmission belt comprising a body formed to a cross sectional configuration in which the top, bottom, and side surfaces are all concaved, said body when viewed in cross section being thinnest at its center and increasing continuously in width to its opposite side edges, the concaved side surfaces of the body constituting means increasing susceptibility of the opposite side portions of the body to compression responsive to the exertion of external pressures thereagainst; and a narrow longitudinal flange integral with and depending from the bottom surface of the body at the thinnest part of the central portion of the body.

3. A transmission belt comprising a body formed to a cross sectional configuration in which the top and bottom surfaces thereof are concaved, said body being solid at its center, the center part of said body when viewed in cross section being thinnest and the body increasing in width toward its opposite side portions, the side portions of the body being hollow to adapt said side portions for compression responsive to the exertion of external pressures thereagainst; and a narrow longitudinal flange integral with and depending from said solid thin center part.

CHARLES Y. JONES.

REFERENCES CITED

The following references are of record in the file of this patent:

UNITED STATES PATENTS

| Number | Name | Date |
|---|---|---|
| 730,832 | Loeb | June 9, 1903 |
| 1,592,416 | Brownell | July 13, 1926 |
| 2,031,565 | Kramp | Feb. 18, 1936 |
| 2,264,332 | Peterson | Dec. 2, 1941 |
| 2,400,667 | Toews | May 21, 1946 |
| 2,472,513 | Bergquist | June 7, 1949 |

FOREIGN PATENTS

| Number | Country | Date |
|---|---|---|
| 73,240 | Germany | June 16, 1893 |